US006688700B2

(12) United States Patent
Gupta et al.

(10) Patent No.: US 6,688,700 B2
(45) Date of Patent: *Feb. 10, 2004

(54) SEATING SYSTEM AND METHOD FOR MAKING THE SAME

(75) Inventors: Vikas Gupta, Farmington Hills, MI (US); Jane M. Palmieri, Farmington, MI (US); Mick F. Heckert, Sanford, MI (US); Gregory J. Korchnak, Howell, MI (US); Eric R. Kurtycz, Lake Orion, MI (US); Gregory P. Reny, Sarnia (CA)

(73) Assignee: Dow Global Technologies, Inc., Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/265,977

(22) Filed: Oct. 7, 2002

(65) Prior Publication Data

US 2003/0075968 A1 Apr. 24, 2003

Related U.S. Application Data

(63) Continuation of application No. 09/766,792, filed on Jan. 22, 2001, now Pat. No. 6,491,346.
(60) Provisional application No. 60/208,694, filed on Jun. 1, 2000, and provisional application No. 60/243,012, filed on Oct. 24, 2000.

(51) Int. Cl.$^7$ ................................................. B60N 2/42
(52) U.S. Cl. ............................ 297/452.18; 297/452.65; 297/378.12; 297/378.13; 297/483; 297/233; 297/232
(58) Field of Search ..................... 297/452.65, 378.12, 297/378.13, 483, 233, 232

(56) References Cited

U.S. PATENT DOCUMENTS

| 3,171,691 A | 3/1965 | Buehrig ................. 297/452.65 |
| 3,638,997 A | 2/1972 | Shaprio et al. |
| 3,669,496 A | 6/1972 | Chisholm |
| 3,712,614 A | 1/1973 | Sherman et al. |
| 4,065,182 A | 12/1977 | Braniff et al. |
| 4,088,367 A | 5/1978 | Atkinson et al. |
| 4,133,579 A | 1/1979 | Springfield |
| 4,142,757 A | 3/1979 | Fogle, Jr. et al. |
| 4,246,734 A | 1/1981 | Fogle, Jr. et al. |
| 4,350,390 A | 9/1982 | Ogawa |
| 4,478,899 A | 10/1984 | Mayumi et al. |
| 4,711,493 A | 12/1987 | Schrom et al. |
| 4,986,600 A | 1/1991 | Leblanc et al. ............. 297/238 |
| 5,029,942 A | 7/1991 | Rink ..................... 297/452.18 |
| 5,100,204 A | 3/1992 | Makihara et al. |
| 5,133,588 A | 7/1992 | Hutchinson et al. |
| 5,224,756 A | 7/1993 | Dukatz et al. ............. 297/238 |
| 5,253,924 A | 10/1993 | Glance |

(List continued on next page.)

FOREIGN PATENT DOCUMENTS

| DE | 4208150 | 9/1993 |
| FR | 2 420 424 | 10/1979 |

OTHER PUBLICATIONS

"The Scene", GE Plastics, Issue 9, Summer 2000.
International Search Report dated Oct. 29, 2001.
Nuss, Rudolf; and Litjens, Frank, "Design and Developement of a New Rear Seat Back Made From Glass Mat Thermoplastic Materials," GE Plastics, p. 1–12.

Primary Examiner—Rodney B. White
(74) Attorney, Agent, or Firm—Dobrusin & Thennisch PC

(57) ABSTRACT

An improved seating system that includes a seat back assembly (10) that is fabricated to include a seat back (12) with first and second wall portions (14,16), and which may include an integrated reinforcement structure (18). The seating system is capable of either or both of withstanding without rupture at least about 11000 Newtons in the direction in which the seat back (12) faces in a plane, parallel to the longitudinal centerline of the vehicle or, upon rapid acceleration up to at least about 20 g, substantially no fragmentation of the seat back with at least a 30 kg mass placed behind the seat back.

30 Claims, 10 Drawing Sheets

U.S. PATENT DOCUMENTS

| | | |
|---|---|---|
| 5,280,995 A | 1/1994 | Elton .......................... 297/238 |
| 5,282,667 A | 2/1994 | Elton et al. ................. 297/238 |
| 5,540,479 A | 7/1996 | Thomas et al. ......... 297/238 X |
| 5,575,533 A | 11/1996 | Glance |
| 5,597,205 A | 1/1997 | Glance et al. |
| 5,601,334 A | 2/1997 | Marks ........................ 297/238 |
| 5,603,550 A | 2/1997 | Holdampf et al. .. 297/378.12 X |
| 5,700,054 A | 12/1997 | Lang .......................... 297/238 |
| 5,704,685 A | 1/1998 | Handa et al. ....... 297/378.13 X |
| 5,713,634 A | 2/1998 | Koike |
| 5,722,732 A | 3/1998 | Haldenwanger ............ 297/483 |
| 5,743,593 A | 4/1998 | Vogt .................. 297/378.12 X |
| 5,895,096 A | 4/1999 | Massara ................. 297/452.18 |
| 5,951,110 A | 9/1999 | Conner et al. |
| 6,079,781 A | 6/2000 | Tilley |
| 6,168,239 B1 | 1/2001 | Conner et al. ...... 297/452.65 X |
| 6,250,680 B1 | 6/2001 | Moker ................... 297/483 X |
| 6,328,386 B1 | 12/2001 | Good ................ 297/378.12 X |
| 6,491,346 B1 | 12/2002 | Gupta et al. ........... 297/452.65 |
| 6,536,844 B2 | 3/2003 | Huse |

SEATING SYSTEM AND METHOD FOR MAKING THE SAME

CROSS REFERENCE TO RELATED APPLICATION

The present application is a continuation in part application, which claims the benefit of the filing date of commonly owned, provisional application Ser. Nos. 60/208,694 (filed Jun. 1, 2000) and 60/243,012 (filed Oct. 24, 2000), and U.S. Patent application Ser. No. 09/766,792, now U.S. Pat. No. 6,491,346, the teachings of which are hereby expressly incorporated by reference for all purposes.

TECHNICAL FIELD

The present invention relates to an improved seating system, and more particularly to an improved system for automotive vehicle seating.

BACKGROUND

There is an ever-growing need for improved seating systems in automotive vehicles. The surge in popularity of hatchbacks, sport utility vehicles and minivans, has posed unique design challenges, in view of the need for seating to be adjustable and in many instances to restrain cargo carried toward the rear of the vehicle. In light of the increased consumer usage of these vehicles for stowage and transport of cargo along with passengers (particularly passengers in rear seats), manufacturers have turned their attention to improving the ability of the seating systems to withstand large loads.

One approach has been to develop improved systems for transmitting loads to the seat tracks of vehicle seating assemblies. A growing number of applications, however, employ attachment of seating components directly to the vehicle body in white for load distribution to the body in white. For the improved seat track technology to be viable in the latter applications, it would require substantial modification, which is believed would unduly complicate the manufacturing procedures, require the development of expensive new processing techniques, or add substantial weight to the vehicles. Accordingly, there is a need for an improved, readily manufactured seating system that is capable of meeting vehicle manufacturer design criteria and government standards for vehicles, and which can be efficiently and conveniently adapted for use in a variety of applications including those involving seat track load distribution, body in white load distribution or both.

SUMMARY OF THE INVENTION

The needs in the art are met by the automotive vehicle seating system of the present invention, which includes a molded plastic seat back having a first wall portion, an opposing second wall portion and one or more reinforcement structures disposed therebetween. An assembly is provided for receiving the seat. Advantageously, the seating system upon rapid acceleration up to about 20 to about 30 g, no fragmentation of the seat back with at least a 36 kg mass placed behind the seat back. The system is easy to manufacture and will not add substantial weight to the vehicle as compared with other commercial seating systems.

DESCRIPTION OF THE DRAWINGS

FIG. 10 illustrates a sectional view of a preferred;

DETAILED DESCRIPTION OF THE PREFERRED EMBODIMENT

Figure 1:
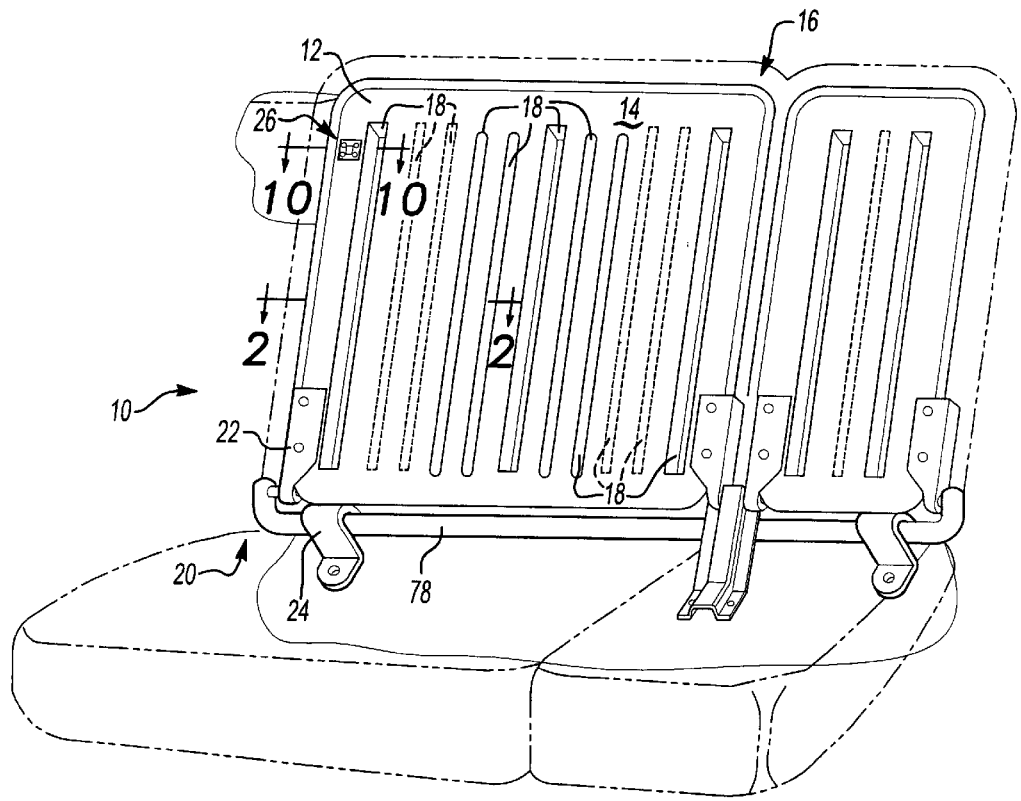
FIG. 1 is a perspective view of a seatback assembly.
Figure 2:
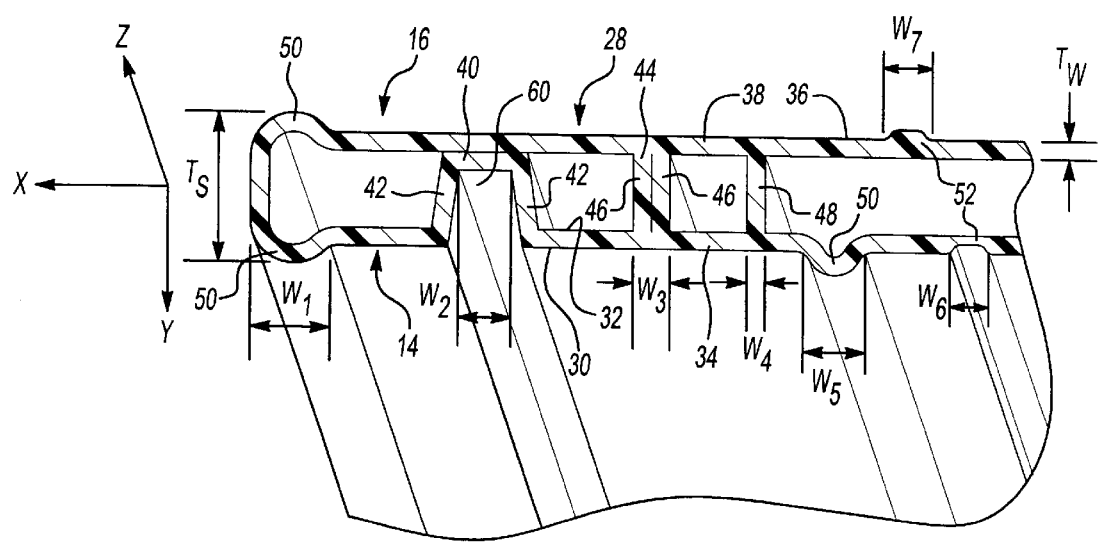
FIG. 2 illustrates a sectional view of the seatback in FIG. 1.
Figure 3A:
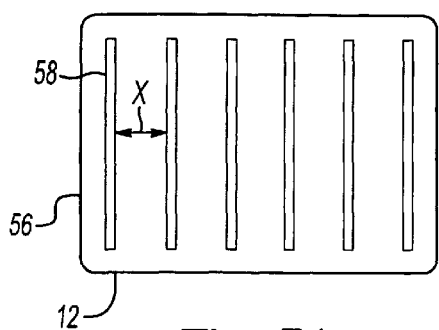
FIGS. 3A–I illustrates examples of alternative seatback integrated reinforcement structure components and patterns.
Figure 3B:
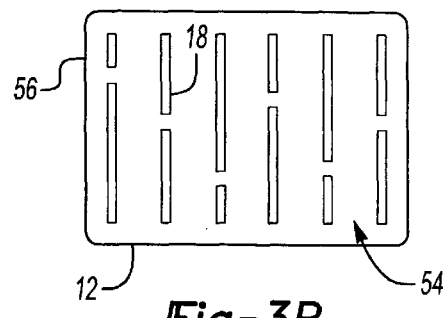
Figure 3C:
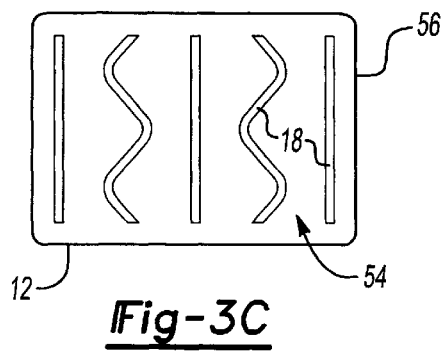
Figure 3D:
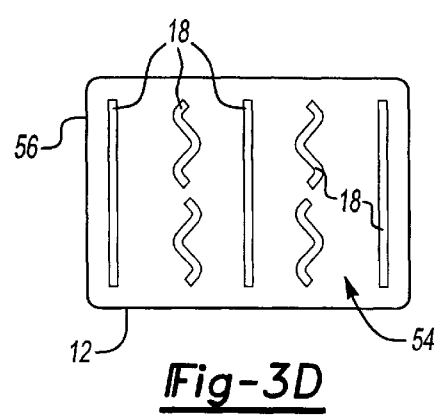
Figure 3E:
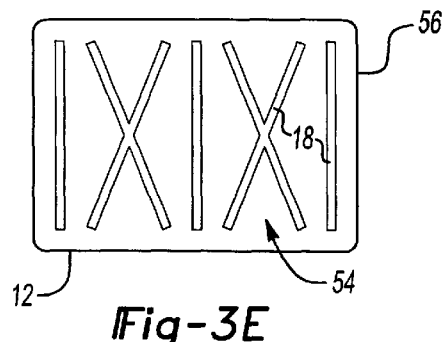
Figure 3F:
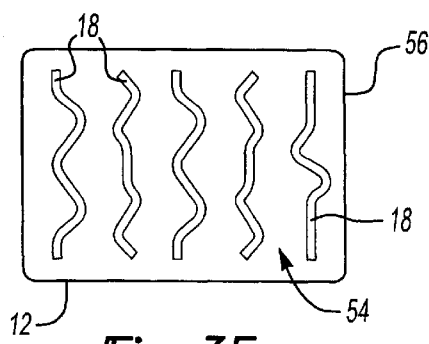
Figure 3G:
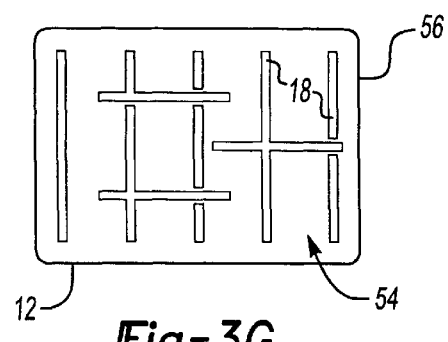
Figure 3H:
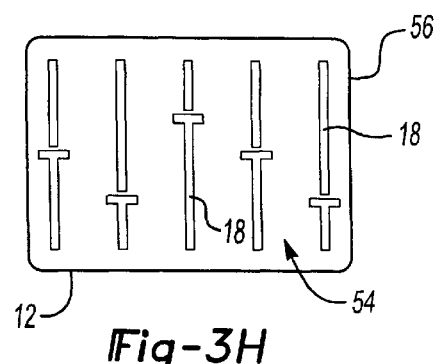
Figure 3I:
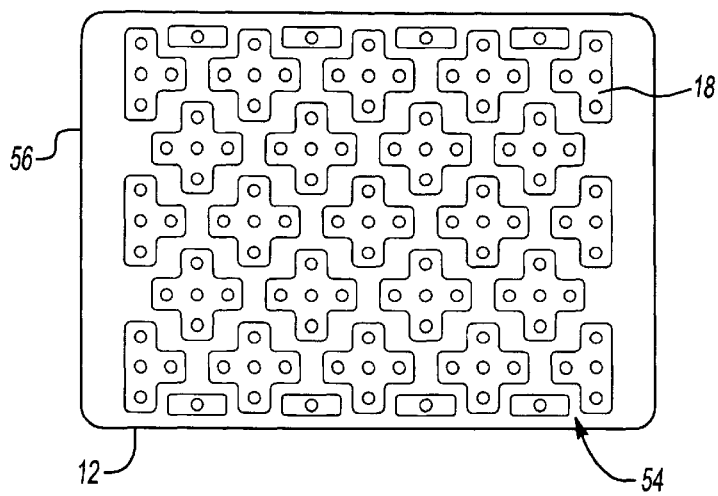

Referring to FIGS. 1 and 2, the present invention is premised upon the development of an improved automotive vehicle seat back assembly 10 having a molded plastic seat back 12 including a first wall portion 14 and an opposing second wall portion 16 (which wall portions may or may not be integrally formed) and one or more integrated reinforcement structures 18 disposed therebetween. A hinge assembly 20 is employed for pivotally anchoring the seat back 12 to an automotive vehicle. The hinge assembly 20 includes a receiving portion 22 for securing the seat back to said hinge assembly, and a mounting portion 24 for securing the hinge assembly to the vehicle. A retention mechanism 26 is employed for maintaining the seat back in a generally upright position. The hinge assembly 20, retention mechanism 26 or a combination of the two effectively define an assembly for attaching the seat back 12 to the vehicle and anchoring it to one or more body in white portions of the vehicle.

As used herein, and illustrated in FIG. 2, by reference to an exemplar molded section 28, the phrase "wall stock thickness" or "wall thickness" shall refer to the dimension ($T_w$) between a first surface 30 and a second surface 32 of a wall, such as first wall 34. Moreover, the phrase "part section thickness" or "section thickness" ($T_s$) shall refer to the dimension between the first surface of the first wall and an outwardly disposed surface 36 of a second wall 38, if cut by an intersecting plane.

The phrase "integrated reinforcement structure" shall refer to a location where, as shown in FIG. 2 the first wall 34 and second wall 38 of a molded component are joined, enlarged or reduced in wall thickness, section thickness, or otherwise configured to effectively create a beamed structural section for creating a locally modified bending moment or otherwise imparting additional rigidity, toughness or impact resistance to a seat back assembly.

By way of further reference to FIG. 2, various different structural configurations are shown, one or more of which can be employed in the design of seat backs for the present invention. One such configuration includes a tack-off 40, having a plurality of walls 42 (shown optionally in contact with the wall 38) that are spaced apart to effectively define a beam structure. Another illustrative configuration includes a tack-off 44 having a plurality of adjoining walls 46 in contact with each other. Yet another illustrative configuration includes a single wall rib 48, which can be formed, for instance, by employing one or a plurality of movable inserts in the tooling during forming. Still another configuration may include an enlarged rib 50 (i.e. having an enlarged portion on one or more of its sides) or some other like configuration. Another configuration includes a wall portion 52 that has a different wall thickness relative to an adjoining wall portion.

As discussed previously, the present invention contemplates the use of integrated reinforcement structures for imparting additional rigidity, toughness or impact resistance to a seat back assembly, or otherwise locally modifying the bending moment of a structure. While a variety of structures may be employed for this purpose, the most preferred structures are selected from ribs, tack-offs or a combination thereof.

Advantageously, in one preferred embodiment in which the seat back is blow molded, integrated reinforcement structures 18 are integrally formed during the molding process. By way of illustration, a seat back is fabricated by blow molding, pursuant to which a parison is placed in a cavity of a first tool adapted for defining the shape of a seat back. The parison is heated to a suitable temperature (e.g., for the preferred materials described hereinafter) from about 100° C. to about 400° C., and more preferably about 225° C. to about 300° C. to induce plasticity. A gas is injected into the parison to cause expansion of the parison within the tool cavity and the formation of generally opposing spaced apart first and second wall portions. At or after the expansion occurs and while the material remains in its plastic state, the first or optionally a second tool is brought into contact with one or both of the walls and deforms each contacted wall in the direction of the opposing wall. In one embodiment, the opposing walls remain spaced from each other. In a more preferred embodiment, the walls are brought into contact with each other and remain in contact by this deformation step, thereby forming a tack-off. It will be appreciated that the effect of forming each tack off is to form a structure having wall portions that project away (e.g., as ribs) from the wall portions from which they are formed.

As illustrated in FIGS. 2 and 3, assuming an x-y-z orthogonal coordinate system, the section and wall profiles vary generally in at least one axis, e.g., in the z direction, to define individual integrated reinforcement structures. The section or wall profile might also vary in either or both of the x direction (i.e. cross car) or y direction (i.e. generally vertical in the seat's upright position) for an individual integrated reinforcement structure. In general the individual integrated reinforcement structures are made up of components that are vertically oriented (i.e. in the y-direction), horizontally oriented (i.e. in the x-direction), of a predetermined geometry, or a combination of some or all of these. A grouping of a plurality of individual integrated reinforcement structures constitutes an "integrated reinforcement structure pattern." A seat back 12 may include one or more patterns 54.

FIG. 3 illustrates examples of various alternative predetermined geometric configurations for individual integrated reinforcement structures 18. FIG. 3 also illustrates examples of various integrated reinforcement structure patterns 54. The individual integrated reinforcement structure 18, the integrated reinforcement structure pattern 54 may include one or a combination of any suitable letter, character, shape, or symbol. Examples of components of such structures or patterns include, without limitation, the "C" shape, "D" shape, "H" shape, "I" shape, "J" shape, "L" shape, "M" shape, "N" shape, "O" shape, "S" shape, "T" shape, "U" shape, "V" shape, "W" shape, "X" shape, "Y" shape, "Z" shape, curves (e.g. sinusoidal curves), zig zags, "+" shape, or the like. Integrated reinforcement structure patterns 54 include a plurality of individual integrated reinforcement structures 18. As seen in FIGS. 3F and 3G, without limitation, the individual integrated reinforcement structure 18 may be a composite of multiple component shapes. The patterns 54 may be random, as seen in FIGS. 3B and 3G, or repetitious, as seen in FIGS. 3A or 3E. One or more different type of integrated reinforcement structures 18 of the type illustrated in FIG. 2 may be employed to define each pattern 54 used in a seat back 12.

For all applications, it should be appreciated that if a vertically oriented integrated reinforcement structure requires openings to allow for air flow during molding, the location of the openings is preferably staggered to help reduce or eliminate hinge points. Further, where a plurality of vertically oriented integrated reinforcement structures is used in a pattern, the horizontal spacing ("x" in FIG. 3A) between each individual integrated reinforcement structure will vary from about 5 mm to about 100 mm and more preferably about 20 mm to about 50 mm.

One or more horizontally oriented integrated reinforcement structures might be incorporated in addition to or in lieu of vertical integrated reinforcement structures to help improve cross-car direction stiffness in a seat back. When employed with vertically oriented integrated reinforcement structures, the horizontally oriented integrated reinforcement structures preferably are staggered between vertically oriented integrated reinforcement structures or otherwise located to help reduce the likelihood they will serve as a hinge point. (See, e.g., FIG. 3G). Horizontally oriented integrated reinforcement structures may be added directly to existing vertically oriented integrated reinforcement structures (see, e.g., FIG. 3G and FIG. 3H). The horizontally oriented integrated reinforcement structures alternatively may be incorporated into an overall pattern so that the integrated reinforcement structure is angled or is substantially perpendicular to the horizontal bending diagonal plane.

The design and location of each integrated reinforcement structure 18 and pattern 54 fabricated in the seat back 12 may be optimized for each individual application, taking into account some or all of the following criteria. For each application, the skilled artisan will appreciate that the specific integrated reinforcement structure employed is configured to help minimize the bending or hinge effect caused by loads resulting from rapid deceleration or acceleration of a vehicle in the presence of a passenger or cargo behind a seat (e.g., that which experienced by a top mounted center shoulder belt, top mounted child seat anchors, and luggage intrusion). For instance, in one preferred embodiment, the integrated reinforcement structure and pattern selected generally is one that will position a portion of the integrated reinforcement structure having a higher bending moment in a position generally perpendicular to the torsional bending diagonal plane.

The use of integrated reinforcement structures is further illustrated in the following discussion, by reference to two of the more commonly expected locations for integrated reinforcement structures, specifically in the perimeter regions of a seat back and in the regions proximate hardware, such as seat belts, seat belt anchors, hinges, latching components or the like.

For a number of applications, it is particularly attractive to incorporate an integrated reinforcement structure around at least a portion of the perimeter 56 of the seat back 12 to help increase horizontal stiffness, vertical stiffness, or both in the perimeter regions of the seat back. With illustrative reference to FIG. 3A, for most applications it is contemplated that an outboard edge 58 of the integrated reinforcement structure 18 is at or within about 50 mm (and more preferably about 15 mm) or less of an edge defining the perimeter 56 of the seat back 12. With further reference to FIG. 2, the width ("w") of any integrated reinforcement structure used in the perimeter regions of a seat back preferably ranges up to about 30 mm, and more preferably it is about 4 to about 20 mm. Particularly for integrated reinforcement structures of the type depicted as tack-off 40 of FIG. 2, such dimension helps to minimize bending in the recessed valley portion 60.

Figure 4A:
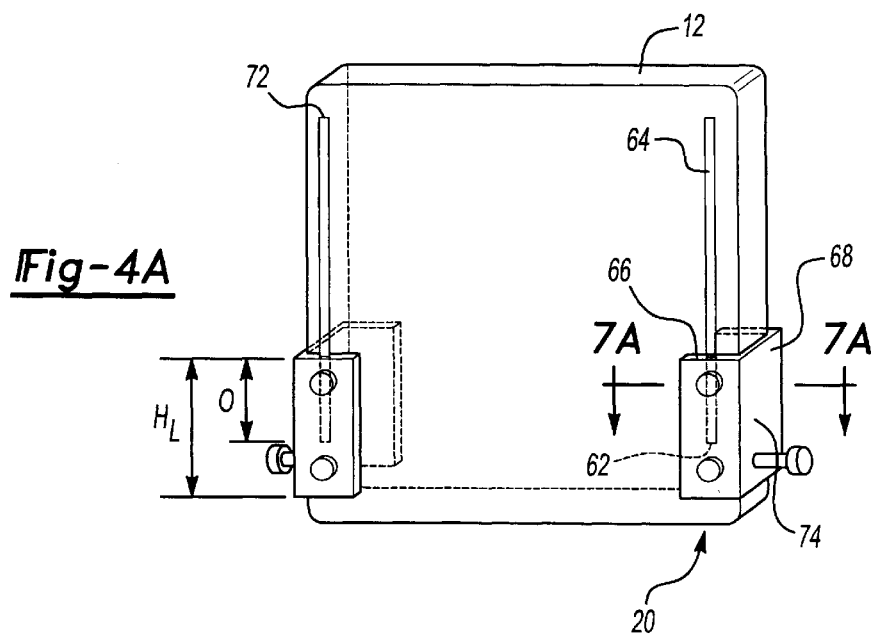
FIGS. 4A and 4B are perspective views of illustrative seatback assemblies.

It is also preferable to form an integrated reinforcement structure in the vicinity of any latch strikers or latch members. In some applications, such as where the seat is intended to carry the load for a center belt, or a child seat tether, it may be desirable to modify, further reinforce or eliminate the top perimeter horizontally oriented integrated reinforcement structure to reduce the potential for hinge effect stress concentrator in that vicinity. By reference to FIGS. 4A and 4B (which show alternative hinge structures), in these applications and others, the bottom end 62 of a vertically oriented perimeter integrated reinforcement structure 64 will be positioned below the highest point 66 of a hinge assembly bracket 68 or other reinforcement 70 securing the seat back to the vehicle. More preferably, the overlap ("O") will range from about 25% to as high as about 100% of the vertical length ("$L_H$") of any hinge or reinforcement. Further, the top end 72 of such vertical perimeter integrated reinforcement structure will be spaced from (e.g., within about 10 to about 200 mm of) the top of the seat. Alternatively, a thicker part section thickness as available by the use of structures 50 or 52 of FIGS. 1 and 2, may be incorporated at the top or bottom of the seat back to help increase stiffness.

In instances where a center passenger shoulder belt system is employed, or a top child seat tether is employed, optionally, design criteria is employed to help reduce the forward, downward and torsional or diagonal bending of the seat back that are caused by perimeter loads at or adjacent the shoulder belt or tether attachments. Preferably the integrated reinforcement structures will provide good vertical stiffness (as this is the plane that is anticipated to endure the more severe bending forces), as well as good torsional stiffness (responsive to the diagonal offset loads a passenger imparts to a shoulder belt system). In such instances, it is preferable to alternate geometries of the integrated reinforcement structures either in a random or predetermined pattern, or to maintain the integrated reinforcement structure width up to about 40 mm, and more preferably up to about 30 mm (e.g., about 5 to about 30 mm).

The employment of vertically oriented integrated reinforcement structures is particularly preferred in the load path for center belt loads and upper child seat tethers to help avoid vertical bending. Preferably, for these applications, the integrated reinforcement structure width (W) will vary up to about 50 mm and more preferably will be about 4 to about 40 mm, and still more preferably will be about 15 to about 25 mm. The vertically oriented integrated reinforcement structure length ($L_R$) will vary between about 70 to about 95% of the vertical seat back height, and more preferably about 80 to about 90%.

It will be appreciated that the above design criteria are preferred but are not intended as limiting. Depending upon the particular applications, variations to the above may be made. Moreover, it should be appreciated that forming an integrated reinforcement structure need not occur in every application, and the need for and magnitude of such generally will be directly proportional relationship to the size of the seat back. Thus, for example, a smaller folding seat may not require a perimeter integrated reinforcement structure or it may only require it in limited areas.

Referring by way of illustration to FIGS. 1 and 4–7 (without limitation as to the other configurations, such as ones excluding a vertically oriented perimeter integrated reinforcement structure), for folding seat backs, the hinge assembly 20 of the present invention is provided in any suitable manner for assuring that the seat back remains anchored to the vehicle body in white in the event of a sudden or rapid acceleration, deceleration, or a large force is applied.

Though it is possible that locally reinforced structures integral with the seat back may be employed in one preferred embodiment, it is contemplated that one or more hinge assemblies 20 are secured to the seat back 12 after fabrication of the seat back. The hinge assemblies 20 preferably include relatively tough and high strength to weight materials (such as plain carbon or alloy steels, or a comparable metal, composite or other material), and are configured for facilitating controlled deformation for transmitting loads.

Figure 14:
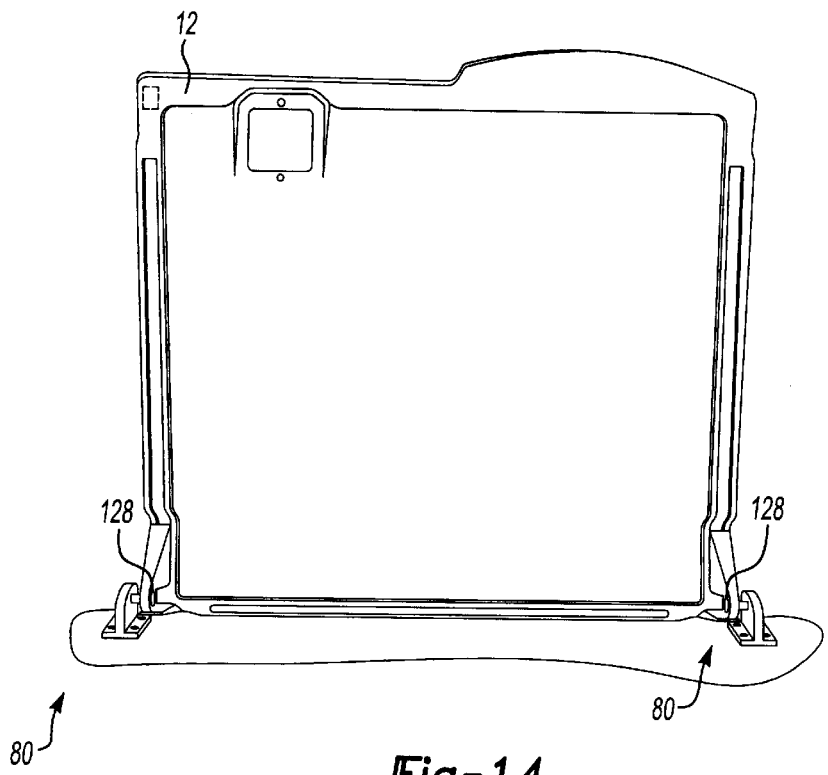
FIG. 14 illustrates an example of an alternate pivotal mounting configuration.
Figure 15:
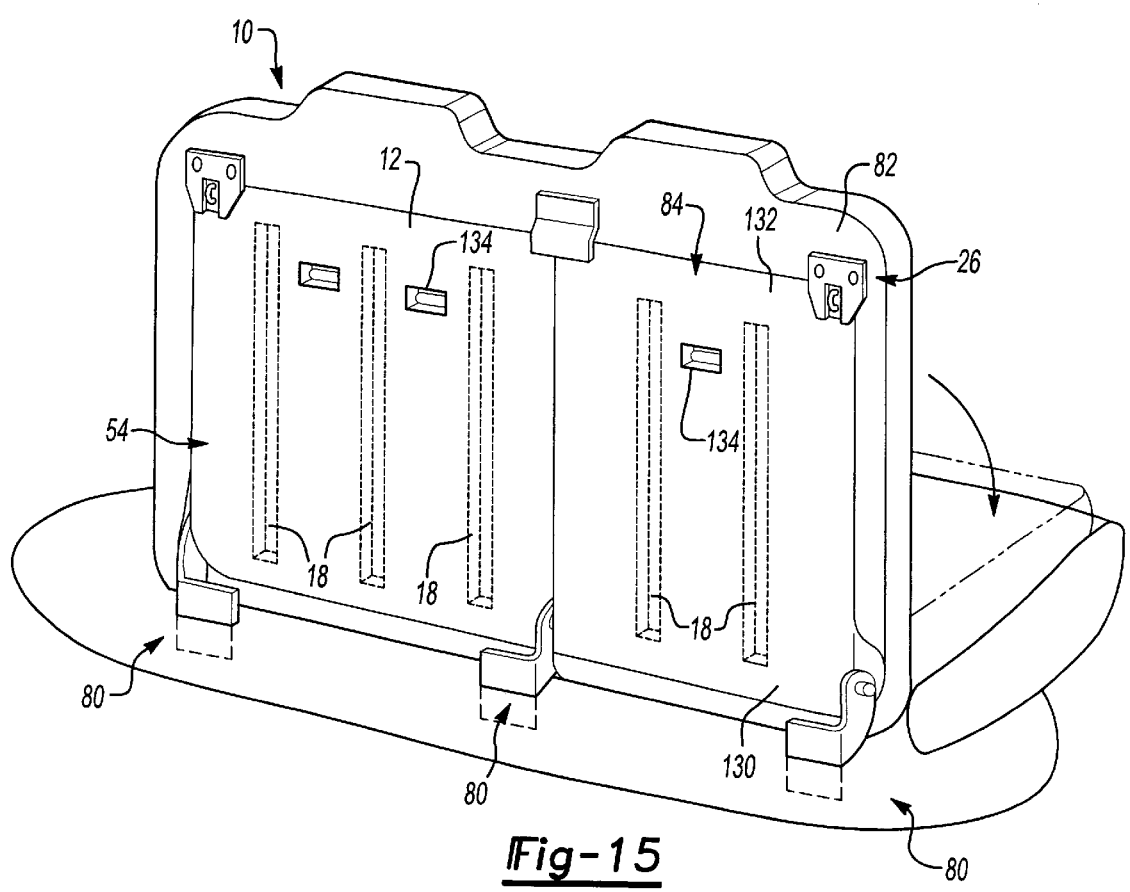
FIG. 15 is a perspective view of an exemplary seatback assembly.

The hinge assembly 20 thus includes a bracket portion 74 adapted for receiving or otherwise engaging the seat back 12, and a suitable pivot portion 76, that can be secured to a vehicle body or other mounting surface, hingedly anchoring the overall seat back assembly 10. In one preferred embodiment, the hinge assembly 20 (and any other anchorage system) is connected to an anchoring substrate, preferably the vehicle body-in-white or an associated structure that has a breaking strength equal to or greater than the breaking strength of the webbing of any seat belt assembly installed as original equipment at that seating position. FIG. 1 illustrates one example of a manner for establishing a pivot attachment, in which a cross bar 78 is mounted to the vehicle body in white and carries the pivot portion and associated bracket portion. In FIG. 14 it can be seen that another alternative is to employ no cross bar, instead having the bracket portion 80 adapted for mounting directly (or with an intermediate structure, such as seat track, pedestal, lower lock/latch, or the like) to the vehicle body in white. In yet another alternative embodiment, as shown in FIG. 15, a frame 82 having a cutout portion 84 is connected to define a seat halo assembly that may be connected to the vehicle body-in-white.

Figure 4B:
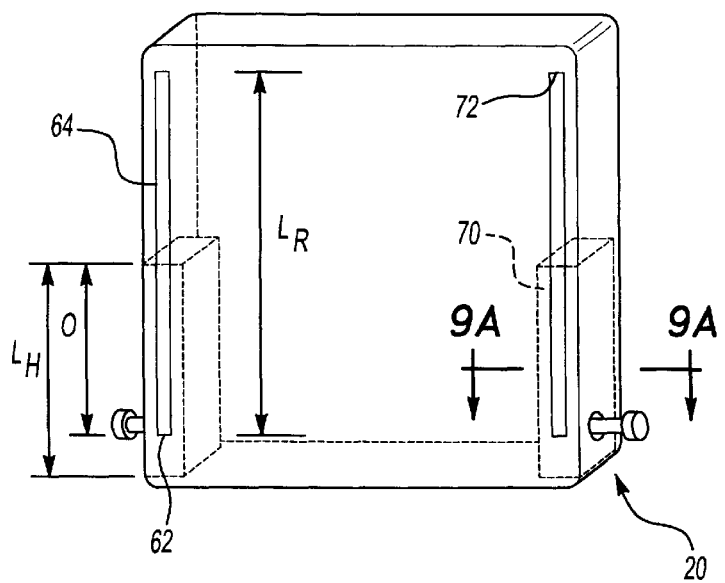
Figure 5:
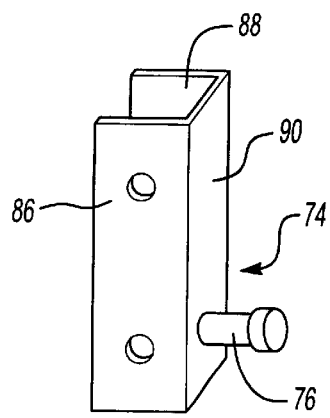
FIG. 5 is a perspective view of one preferred hinge structure.
Figure 6:
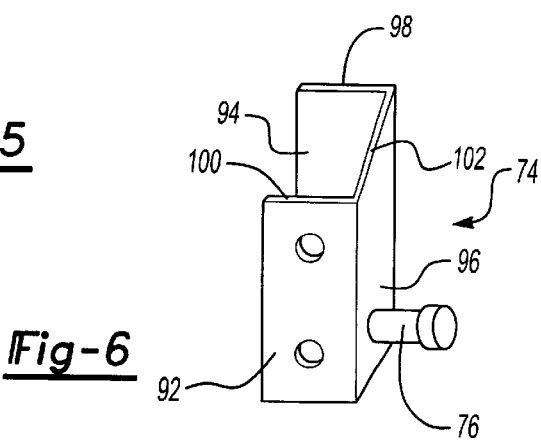
FIG. 6 is a perspective view of another preferred hinge structure.

The bracket portion 74 is adapted to receive the seat back in a nesting or mating type relationship, with the bracket portion acting as either or both of a male portion (e.g., if it is structured as a plate reinforcement member 70, or another such insert member as in FIG. 4B) or female portion as generally shown in FIGS. 4A and 5–7. As illustrated in FIGS. 4–6, for the female portion bracket type includes a plurality of adjoining walls for defining a well or a generally "U-shaped" channel (with or without at least one closed end)

for receiving and holding the seat back 12. The average wall thickness of the bracket, assuming a high strength metal such as steel, will range from about 1 to about 3 mm.

In one embodiment, the bracket portion is an elongate member, having a length of about 30 to about 300 mm, and a width of about 10 to about 75 mm. (See e.g., FIGS. 5 and 6.) The well or wells can be disposed anywhere along the length of the hinge assembly (e.g., at one or both of its ends, or at an intermediate location). The walls may be configured in any suitable manner, with FIG. 5 illustrating two such configurations. In FIG. 5, the walls include a first side wall portion 86 and a second opposing side wall portion 88, both of which are about the same length, and have an intermediate wall portion 90 bridging them. In FIG. 6, a first side wall portion 92 and a second side wall portion 94 are joined with an intermediate portion 96. The first and second side portions are arranged so that a distal end 98 of the second side portion extends beyond a distal end 100 of the first side portion 92. The intermediate side portion 96 is such that it optionally includes a section terminating at an edge 102 that extends beyond the distal end 100 of the first side portion 92 toward the distal end 98 of the second side portion 94. The edge 102 may be any suitable configuration, e.g., linear, curved, stepped or the like, as shown in the illustrations of FIGS. 8A–8D. Further, though FIGS. 9A–9D illustrate a front to rear upward slope of the edge 102, the slope of the edge could be downward.

Figure 7A:
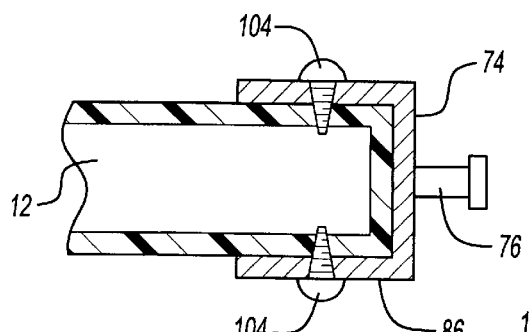
FIGS. 7A–7D illustrate examples of alternative hinge configurations.

The hinge assembly is secured to the seat back 12 using any suitable joining technique. It may be mechanically fastened (e.g., by screws or shoulder bolts), adhesively fastened, a combination thereof, or otherwise. In a particularly preferred embodiment, as illustrated in FIG. 7A, a fastener 104 is secured through the first wall portion 14 and second wall portion 16 of the seat back and the hinge bracket 74. In FIG. 7C a fastener 104 is fastened to a stud that is formed in the hinge bracket 74 or otherwise placed between the opposing side wall portions.

Figure 7B:
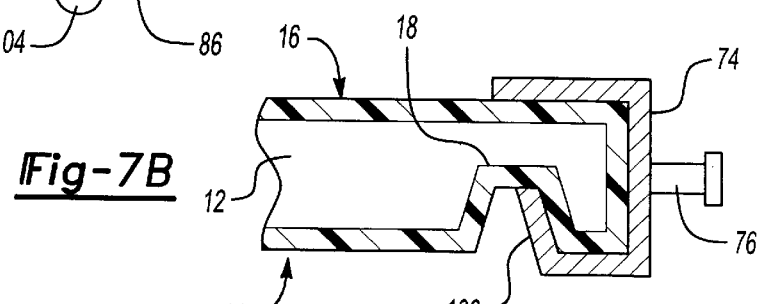
Figure 7C:
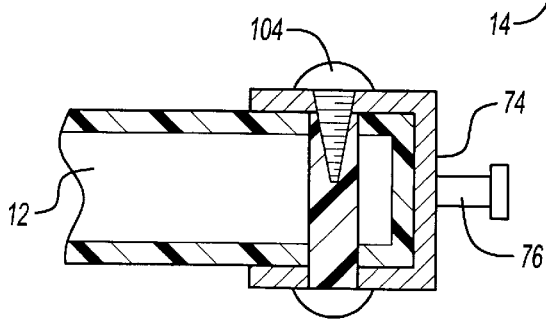
Figure 7D:
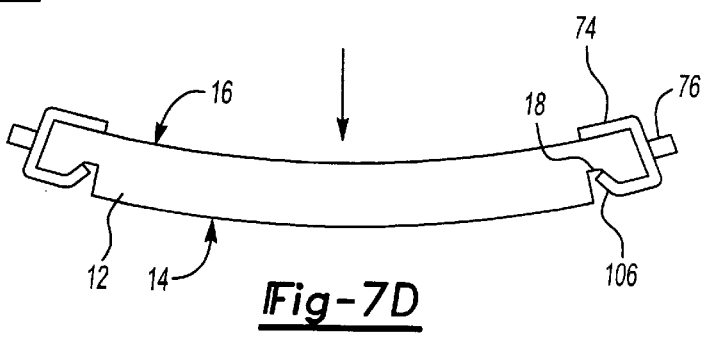
Figure 8A:
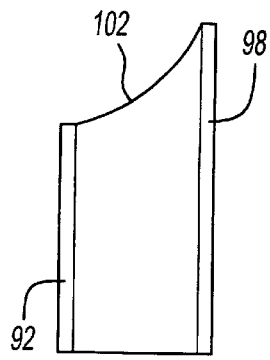
FIGS. 8A–D illustrates examples of alternative hinge bracket configurations.
Figure 8B:
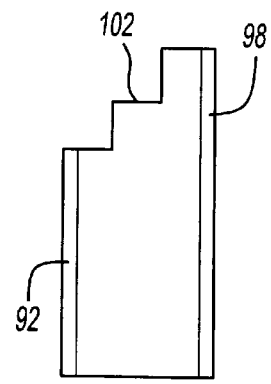
Figure 8C:
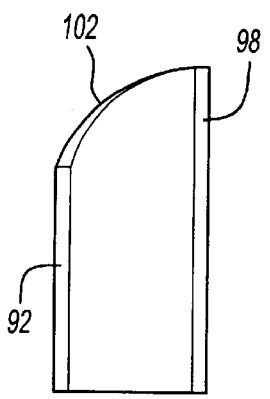
Figure 8D:
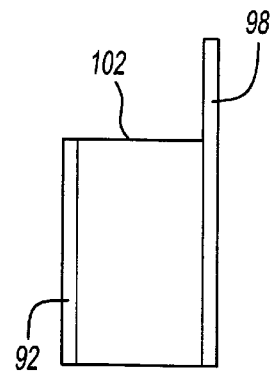
Figure 9A:
FIGS. 9A–9F illustrate examples of seat back reinforcements.
Figure 9B:
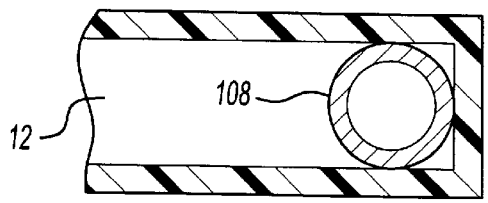
Figure 9C:
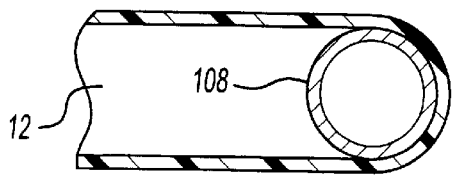
Figure 9D:
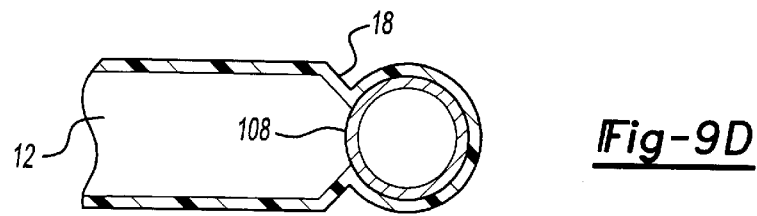
Figure 9E:
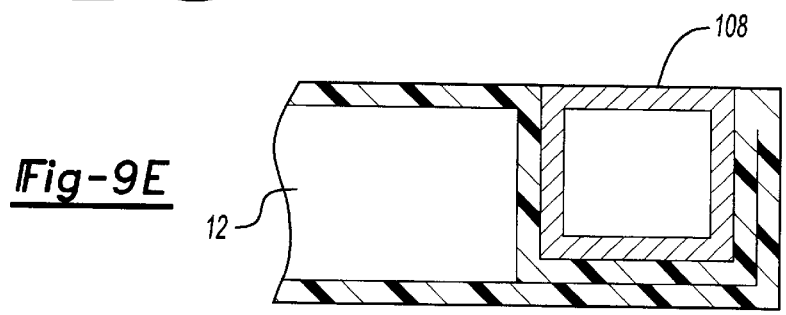
Figure 9F:
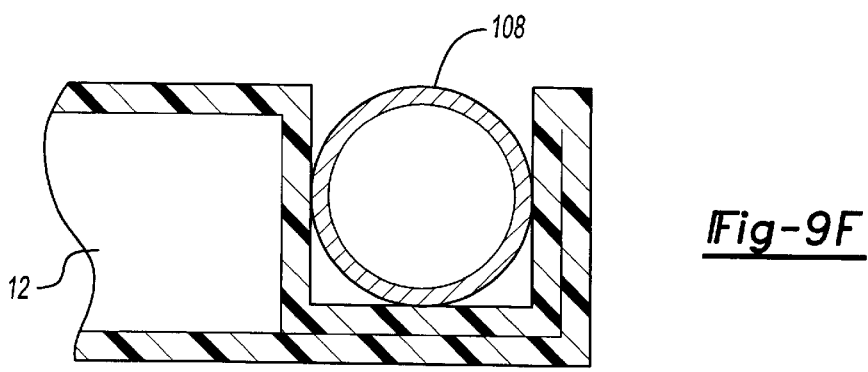

As shown in FIG. 7B, in another embodiment, one possible bracket includes a side wall portion configured with a projection 106 for cooperating with an integrated reinforcing structure 18 and establishing an interference connection, thereby reinforcing the attachment in response to forward directed longitudinal forces (as illustrated in FIG. 7D). For instance, the bracket may be crimped into a tack off, or preformed to include a projection that penetrates the volume defined by the tack off, or otherwise grips an integrated reinforcement structure.

Referring to FIGS. 9A–9F, the hinge assembly optionally may be further reinforced by the placement of a supplemental reinforcing insert 108 of suitable geometry (such as triangular, square, polygonal, rounded or otherwise) between or outside of the walls of the seat back, preferably in the vicinity of the bracket. Though it may be a steel (as with a hinge bracket), the reinforcing insert 108 preferably is made of a relatively tough and high strength to weight material, such as titanium, magnesium, aluminum, plastic, plastic composite, carbon fiber or the like. The supplemental reinforcement may be hollow or solid, and it may extend the entire span of the bracket or only a portion of it, or even beyond the bracket. By way of example, for split seats, the typical vertical length of one such reinforcement may range up to about 300 mm, with a cross car width of about 10 to about 75 mm and a fore/aft depth of about 12 to about 37 mm.

It should be appreciated that the use of supplemental reinforcements is not limited to the regions adjacent the hinge assembly, but may be anywhere within the assembly. In this regard, a relatively rigid member, such as a metal (e.g., steel), composite, unfoamed plastic, or foamed plastic (either prefoamed or foamed in situ) may be incorporated between walls of a seat back wherever localized reinforcement is sought. Without limitation, examples of suitable foams include polyurethanes, epoxies, styrenics, or the like. Softer foams may also be employed for noise and vibration absorption.

Generally, the hinge assembly 20 will result in a portion of the seat back 12 that is susceptible to function as a deformation site or stress concentrator in the event of a sudden or rapid acceleration or deceleration of the vehicle. As seen in FIG. 1, such anticipated deformation site is placed toward the wall that will be forward facing when assembled in the vehicle. For instance, it may be located along the leading edge of the seat back for inducing a compressive load in that region.

As will be appreciated, the brackets described above are particularly advantageously used in foldable seat applications such as found in rear seats of hatchback vehicles sedans or coupes. However, they may also be suitably employed in free standing seating assemblies, in which case they will be mounted to a pedestal or other structure associated with a seat track.

Figure 10:
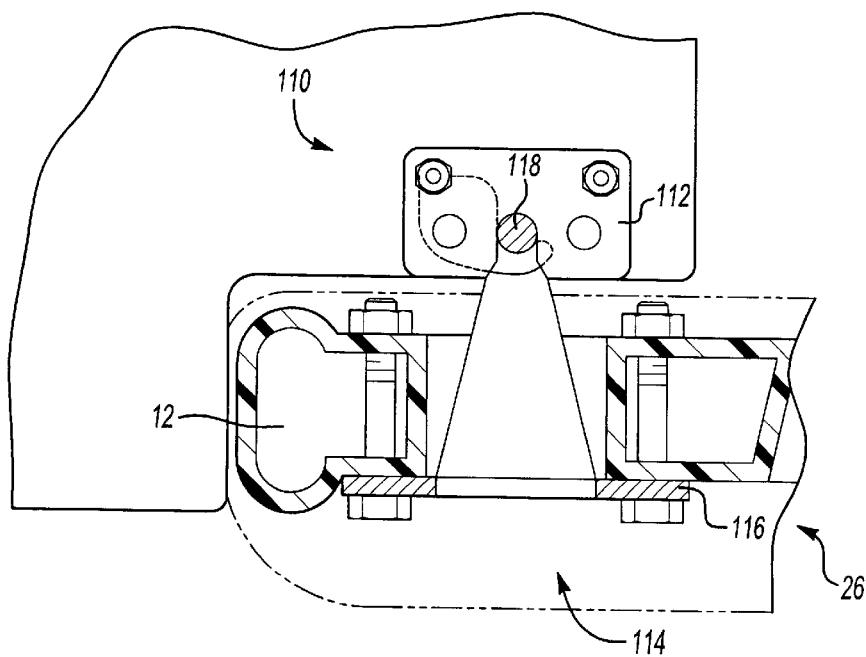
FIG. 10 illustrates a section view of a preferred retention mechanism.

As discussed elsewhere herein, and referring now also to FIGS. 1, 10, and 11 the present systems may incorporate one or more retention mechanisms 26 (e.g., latch assemblies) at any of a number of different locations on the seat assembly (e.g., along the seat sides, on the seat back, or along the top of the seat back), for affording releasable self locking of the seat back to the vehicle relative to its hinge. It is preferred that any such retention mechanism provide a sufficient combination of high strength and good load distribution over the structure to which it is attached and high strength. Preferably, the configuration is such that the seat is maintained in place by the retention mechanism in the event of a sudden or rapid acceleration, deceleration or other force, so that load on the seat back can be transferred as desired within the seat back.

Retention mechanism configurations may vary application to application. However, once engaged, for a forward-facing seat preferably such mechanism preferably will not release or fail when a forward longitudinal force (Newtonss), equal to the product of 9.8 and 20 times the mass of the hinged or folding portion of the seat (kilograms), is applied approximately through the center of gravity of the latched seat portion. Moreover, once engaged, the mechanism preferably also will not release or fail when subjected to an acceleration of about 20 g., in the longitudinal direction opposite to the seat folding direction.

One preferred retention mechanism is a latch assembly 110, as shown in FIG. 10, which includes a conventional latch 112 having a retractable pawl, and a corresponding striker 114. Though illustrated with reference to a striker secured to the seat back, either the striker or the latch may be secured to the seat back, with appropriate configurations to avoid having it pull through the seat back 12.

Figure 11A:
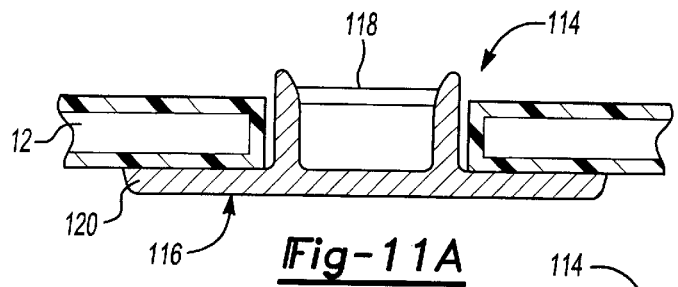
FIGS. 11A–11F illustrate examples of alternative striker assembly configurations.
Figure 11B:
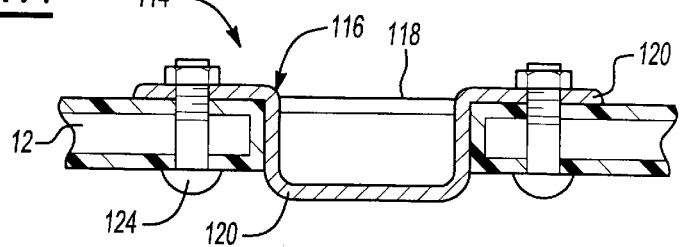
Figure 11C:
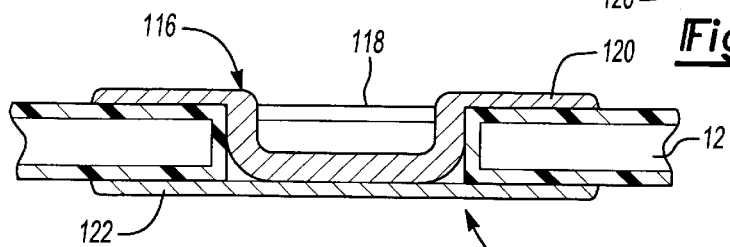
Figure 11D:
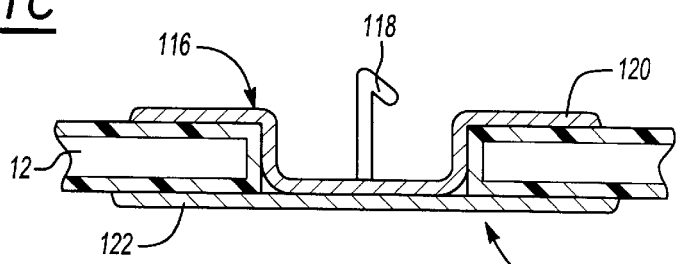

Illustrative alternative configurations are disclosed in FIGS. 11A–F. In each instance-the striker 114 includes at least one mounting portion 116 for attaching to the seat back 12 (either adhesively, with suitable fasteners, or otherwise) and a projecting striker bar 118 (which projects through an aperature or slot in the seat back 12). The mounting portion 116 includes one or more flanges 120 for overlapping with and engaging the seat back 12 or an integrated reinforcement structure 18 associated with it (e.g. FIG. 11F). The overlap preferably ranges from about 3 mm (and more preferably about 10 mm to about 150 mm). As shown in FIGS. 11C and 11D, in some embodiments a supplemental reinforcing plate 122 or like structure may also be employed.

Figure 11E:
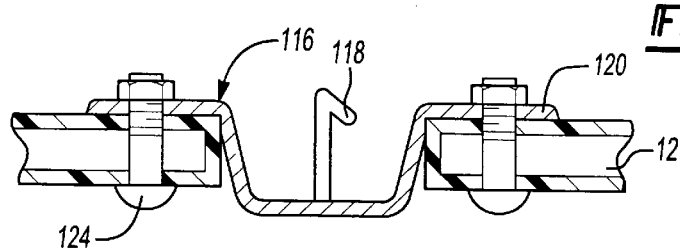
Figure 11F:
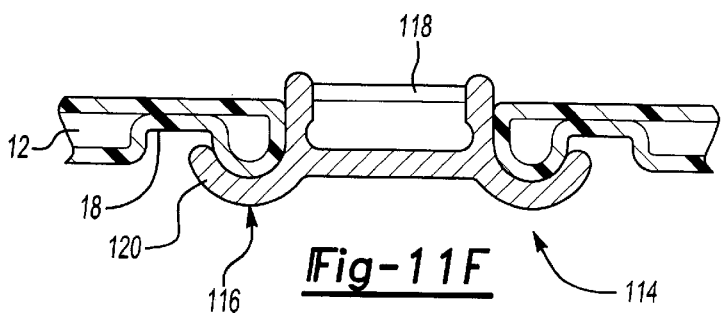

All illustrated in FIGS. 11B and 11E, without limitation, shoulder bolts 124 or other like structures may optionally be employed as desired for securing the retention mechanism 26 to the seat back 12.

Figure 12:
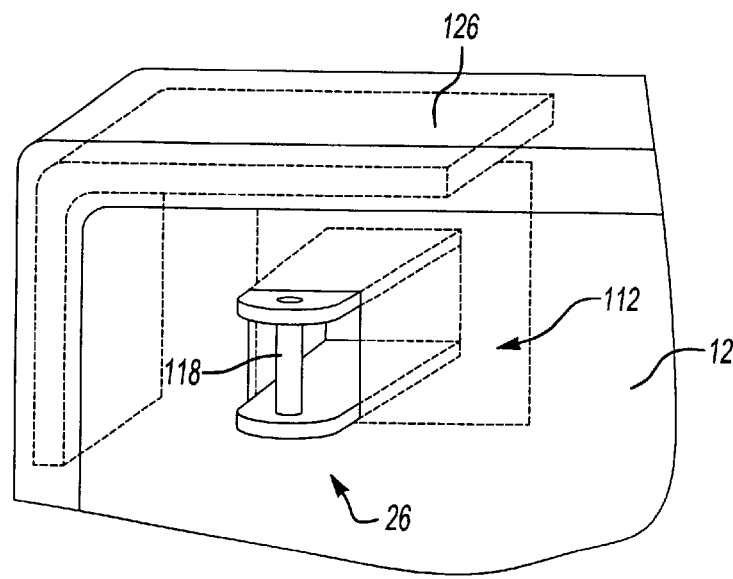
FIG. 12 illustrates a perspective retention mechanism view of another exemplary seat back structure.

It may be desirable to further reduce the potential for the retention mechanism to create a hinge point, by locally reinforcing the seat back in or adjacent the region to which the latch member is secured. This can be done in any suitable manner, for instance, by the incorporation of one or more integrated reinforcement structures in that region or by incorporation of an additional or supplemental metal, plastic or composite reinforcement member within the seat back, about the entirety or at least a portion of the perimeter of the seat back. For instance, FIG. 12 illustrates an L-shaped supplemental corner reinforcement 126, which is a relatively rigid member located between the opposing walls of the seat back. The supplemental reinforcement 126 can also be reoriented orthogonally about the z-axis relative to the position shown in FIG. 12. Of course, in such regions, integrated reinforcement structures may be employed as desired to achieve such reinforcement. Typically, if the striker bar 118 is located below about 20% of the height of the seat back, measured from the top of the seat back, then the supplemental reinforcement member is incorporated and positioned generally in the anticipated load path between a seat belt mounting point (if any) and the striker bar 118.

It will be appreciated that the use of a supplemental reinforcement member is not limited to the vicinity of the latch. One or more supplemental reinforcement members may be used elsewhere in the seat back. For instance, a hybrid seat back having a rigid supplemental reinforcement member may be placed between or outside of the seat back walls generally about the perimeter of the seat back.

Figure 13:
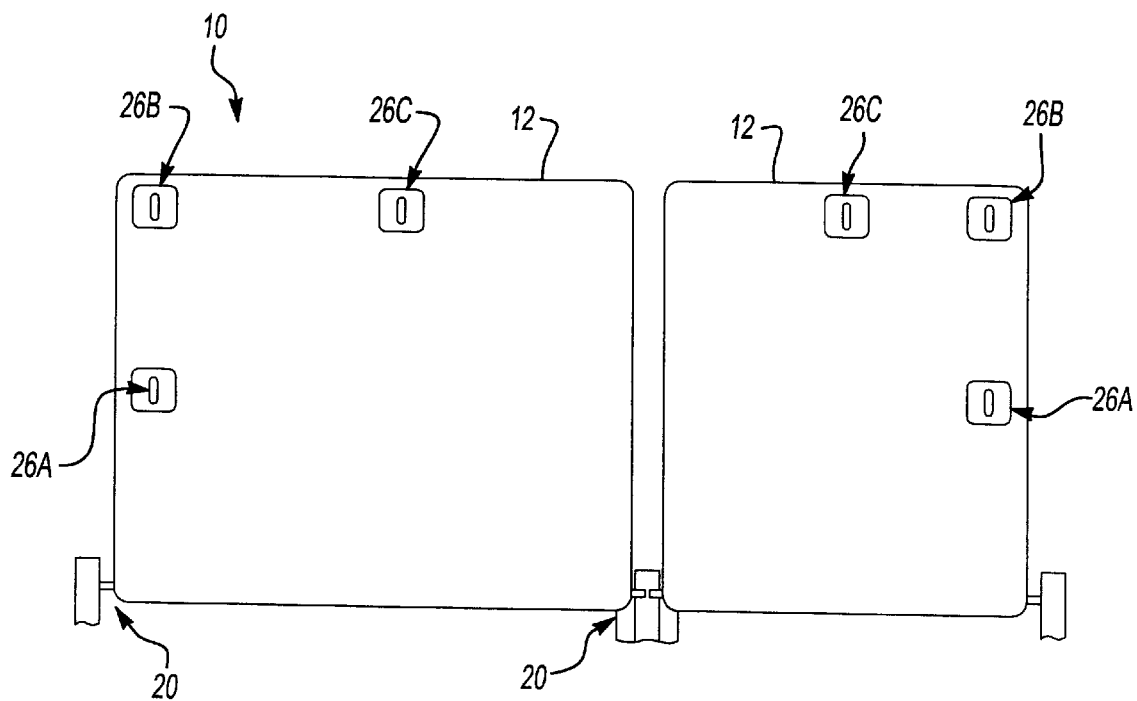
FIG. 13 is an elevation view of a seat back assembly.

With reference to FIG. 13 there is shown a typical split folding seat back assembly. The location of the retention mechanisms may be anywhere proximate the top or sides of the seat backs. Illustrated are alternative first, second and third respective locations 26A illustrating along a seat back side; 26B illustrating in one of the seat back corners; and 26C illustrating along the top of the seat back.

Referring to FIG. 14, a seatback configuration is illustrated with a pivotal mounting member. This configuration illustrates a seatback 12 with an extending pivot member 128. The extending pivot member 128 is configured such that the seatback 12 may be pivotally mounted to a bracket portion 80 thus negating the need for a cross bar 78.

As will be appreciated, proper material selection will permit efficient design and molding of optimal wall thicknesses, part section thicknesses or both, for achieving the desired performance without substantially increasing vehicle weight or intruding into interior space availability. By way of example, it is desired for many applications that the maximum wall stock thickness will range up to about 6 mm or higher, more preferably it will range from about 1.5 mm to about 4.0 mm, and still more preferably, it will range from about 2.5 mm to about 3.5 mm. Likewise, the maximum section thickness will range up to about 60 mm, more preferably it will range from about 20 mm to about 40 mm, and still more preferably it will range from about 25 to about 35 mm.

The materials selected for forming the walls of the seat backs of the present invention preferably exhibit an elastic modulus ranging from about 500 MPa to about 6000 Mpa, and more preferably about 1300 to about 1500 MPa, and still more preferably about 1700 to about 2500 MPA. In applications when the seat back is also to be used as a load bearing floor, it is preferable to select a material toward the higher end of the ranges.

The preferred flexural modulus will be at least about 600 MPa, more preferably it will range from about 200 to about 500 ksi (1300 to about 3500 MPa), and still more preferably about 250 to about 350 ksi (1700 to about 2500 MPa).

The preferred yield strength of the material ranges from about 20 to about 200 MPa. More preferably it will range from about 25 to about 70 MPa and still more preferably about 35 to about 55 MPa. Moreover, the ductility (as measured by percent elongation) of the material preferably ranges from about 20% to about 150%, and more preferably it is at least about 30% and still more preferably, it is at least about 100%.

The material also will preferably exhibit attractive processing characteristics, such as a melt flow rate (230° C./3.8 kg-1; according to ASTM D1238) of about 0.300 to about 5.0 g/10 min to about 0.900 to about 3 g/10 min; a softening point (according to ASTM D1525) of less than about 180° C., and more preferably about 90° C. to about 150° C.; linear-flow mold shrink (according to ASTM D 955) of about 0.076 mm/mm (0.003 in/in) about 0.203 mm/mm (0.008 in/in) and more preferably about 0.152 mm/mm (0.006 in/in) to about 0.178 mm/mm (0.007 in/in); or a combination of these properties.

Accordingly, in one preferred embodiment, the seat back of the present invention preferably is made from a plastic material, and more preferably a thermoplastic material. In a particularly preferred embodiment, the seat back is made from a high strength thermoplastic resin selected from styrenics, polyamides, polyolefins, polycarbonates, polyesters or mixtures thereof. Still more preferably they are selected from the group consisting of acrylonitrile butadiene styrene, polycarbonate/acrylonitrile/butadiene styrene, polycarbonate, polyphenylene oxide/polystyrene, polybutylene terephthalate, polybutylene terephthalate/ polycarbonate, polyamide (e.g., nylon), polyesters, polypropylene, polyethylene, and mixtures thereof.

Examples of preferred commercially available materials include PULSE® 2200 BG and MAGNUM® 1150 EM, both available from The Dow Chemical Company.

The skilled artisan will recognize that the above teachings may be modified in any of a number of ways yet still stay within the scope of the present invention. Among the many different options are the following.

While the technology of the present invention has been illustrated in connection with a blow molding fabrication process, it is not intended to be limited to such process. Like results may be attainable using the teachings of the present invention in combination with other fabrication techniques, including but not limited to injection molding, lost core processing, rotoforming, compression molding (with or without decorative or structural inserts), thermoforming, or the like. Preferably, when blow molding, the processing temperature will range.

As will be appreciated from the above, preferred seating systems that are optimized in accordance with the criteria outlined herein, and using the referenced materials, consistently should pass United States and European government test standards for motor vehicles (e.g., as addressed in FMVSS 207, FMVSS 210, FMVSS 225 (49 CFR 571.207, .210, .225) or ECE 17; all such standards being expressly incorporated by reference herein) as well as the requirements of automobile original equipment manufacturers and their suppliers.

In one embodiment, the seating system (1) is capable of withstanding without rupture at least about 11000 Newtons in the direction in which the seat faces in a plane, parallel to the longitudinal centerline of the vehicle; (2) exhibits, upon rapid acceleration up to at least about 20 g, substantially no fragmentation of the seat back with at least a 30 kg mass placed behind the seat back; or (3) both (1) and (2).

More preferably, the seating system (1) is capable of withstanding without rupture at least about 13000 Newtons in the direction in which the seat faces in a plane, parallel to the longitudinal centerline of the vehicle; (2) exhibits, upon rapid acceleration of about 20 to about 30 g, substantially no fragmentation of the seat back with at least a 36 kg mass placed behind the seat back; or (3) both (1) and (2).

Though not intended to be limited thereby, in one embodiment, the seats, the anchorages, attachment hardware, and attachment bolts for the systems of the present invention are capable of withstanding without complete rupture at least a 3000 pound force and more preferably a 5,000 pound force. In one particularly preferred embodiment, the system is capable of withstanding a force of at least about 13,000 N to about 22,000 N generally in the direction in which the seat faces (to a pelvic body block)in a plane parallel to the longitudinal centerline of the vehicle, with an initial force application angle of not less than about 5 degrees or more than about 15 degrees above the horizontal. Still more preferably, the system withstands such force even when applied at an onset rate of not more than about 133,000 N per second to about 222,000 N per second, whereby the force is attained in not more than about 30 seconds and is maintained for about 10 seconds.

In yet another embodiment, each seat assembly is capable of withstanding
(a) in any position to which the seat can be adjusted, a force (Newtons) of 20 times the mass of the seat in kilograms multiplied by 9.8 applied in a forward or rearward longitudinal direction; or
(b) in its rearmost position, a force that produces a 373 Newton meters moment about the seating reference point for each designated seating position that the seat provides (as applied to an upper cross-member of the seat back or the upper seat back, in a rearward longitudinal direction for forward-facing seats).

In yet another highly preferred embodiment, the seatback of the present invention is incorporated into a seat assembly, and two 18 kg masses (e.g., cubes with an edge length of about 300 mm) are placed about 200 mm from the seat back. Upon rapid acceleration to at least about 20 to about 30 g, the seatback maintains the cargo disposed behind the seat back, with no visible fragmenting of the seat back or formation of sharp edges or corners.

Advantageously, in one additional preferred embodiment, the seat backs made in accordance with the present invention are capable of exhibiting a set less than 6 mm after soaking for about 4 hours at about 82° C. with an applied load of about 244 kg/m$^2$ and a momentary load of about 615 kg/m$^2$.

The stiffness, impact strength, and crack resistance of this seat back also will greater than conventionally fabricated current blow molded polyethylene, filled polyethylene, polypropylene, or filled polypropylene seat backs.

The present invention contemplates techniques and methods for the optimization of one or more of material selection, wall thickness, section thickness, hinge design, and latch design, for realizing the desired stiffness and strength to meet traditionally demanding load requirements in automotive vehicles occasioned of center mounted shoulder belt loads, child seat anchor loads, or cargo intrusion. The skilled artisan will recognize, however, that from application to application, design requirements will vary, and therefore a reasonable amount of experimentation may be needed to adapt the various teachings to the unique intended environment. By way of example, part size, seat belt location, hinge points, latch locations, and split ratio may affect final design. It is believed that the use of conventional computer aided engineering (CAE) techniques in combination with the present teachings will yield satisfactory results, which can be improved as desired with conventional techniques for localized steel reinforcement (e.g., in high stress areas, such as hinge points, latch areas, seat belt mounting areas, and armrest support areas).

Thus, the present invention finds useful application in connection with any of a number of different types of seating systems, including but not limited to, adjustable seats, fixed position seats, foldable seats, seats pivotal about an axis, including but not limited to hinged seats. The seats may be vehicle rear seats, vehicle front seats, jump seats or the like. Moveable seats may be held in place by latches disposed in the central portion of the seating configuration (e.g., at the top), along the seat sides (anywhere from the top to the bottom), or elsewhere. Fixed seats may include no latch assembly nor any assembly. The seating system may include one or more rear seats that fold downward to a larger storage area, and which may require the seat back to act as load floor. The seat may be a split design (e.g., about 50/50, 60/40, 70/30 or the like), or the seats may constitute a one piece design. In one embodiment, the seat back is latched to either a structural package shelf (top latches) or to the body in white (side outboard latches), and seat belt anchors or seat belt guidance system (as may be needed for a center mounted belt) for the two outboard seats is not attached on the seat. (See FIG. 1).

A sliding lock pin might be incorporated between two folding seats. The sliding pin can be unlocked to fold down one portion of the seat and self locking when the seat backs are both upright. Localized reinforcement (e.g., steel reinforcement or plastic foam) for a spreading loads may be incorporated into potential stress concentration locations, such as hinge points, latch areas, seat belt anchorage locations, child seat tether anchor locations, head rest attachments, armrest support areas, or the like.

In another embodiment, seat belt anchors or a seat belt guidance system for the center seat belt and/or child tether anchors are attached to the seat. Preferably, the top center seat belt mounting location is towards the middle of the seat back to help minimize the extent of cantilever, thereby helping to minimizing bending in response to a force.

Though it finds application in a variety of other environments (e.g., rail transportation seating, air transportation seating, amusement park rides, auditorium or stadium applications, or elsewhere), the present invention is particularly suitable for application in automotive vehicles of a number of different types, including but not limited to passenger cars (including sedans, coupes, station wagons, convertibles, or the like), multipurpose passenger vehicles (including sport utility vehicles, sport activity vehicles, minivans, or the like), trucks, and buses.

Systems of the present invention are not limited to seat backs, but may also include one or more additional components for a vehicle interior system, particularly a seating system, such as seat belts, and seat belt anchorage components for transferring seat belt loads to the vehicle structure, including, but not limited to, the attachment hardware, seat frames, seat pedestals, the vehicle structure itself, and other parts of the vehicle that help to prevent of the belt from the vehicle structure. The systems may optionally include supplemental inflatable restraint systems, such as air bags. Other seating system components that are contemplated as within the systems of the present invention include, without limitation, seat adjusters (power actuated and manual), lumbar supports, child seats, child seat tether anchors, synthetic upholstery, natural upholstery (such as leather), seat warmers, seat coolers, headrests, integrated stereo components, arm rests, leg rests, cup holders, or the like. While in a preferred embodiment the seat belt incorporated into the system is a shoulder belt, and more preferably a three point harness, other seat belt types may also be used, such as lap belts only, lap belts with a separate or detachable torso belt.

As will be appreciated, the present invention also affords considerable design and manufacture flexibility, including but not limited to the ability to vary the configurations and contours of the respective opposing walls of a seat back. For instance, a first wall could be moldably configured to provide a suitable lumbar support. An opposing wall (i.e., the rearward facing wall when the seat back is in its upright position) could be configured to provide a relatively flat surface for carrying loads. Optionally, the opposing wall could be configured with suitable component housings or cargo carrying implements such as troughs, tie down members, tonneau cover brackets, seat belt retractor housings, or the like.

EXAMPLE 1

Two seat back assemblies are fabricated for a sedan vehicle, such as the seat back assembly as shown generally in FIG. 15 having individual integrated reinforcement structures 18 defining an integrated reinforcement structure pattern 54 and an upper edge latch (not shown). One is fabricated using blow molded PULSE® 2200 BG resin (from The Dow Chemical Company). The other one is fabricated using blow molded MAGNUM® 1150 EM resin (from The Dow Chemical Company). A halo frame 82 carries the seat backs, which are hingedly connected along their bottom edge 130 and latched along the top edge 132. As with Examples 2–4, the seat back includes two child seat tether anchors 134, although other applications may include no anchor, a single anchor or more than one anchor, upper or lower. The final seat back has an average wall thickness in the seat back of about 3 mm, and an average section thickness of about 25 mm. Both assemblies pass United States and European government test standards for motor vehicles as addressed in FMVSS 207 (49 CFR 571.207), FMVSS 225 (49 CFR 571.225) and ECE 17, as well as the requirements of automobile original equipment manufacturers and their suppliers.

EXAMPLE 2

Two seat back assemblies are fabricated for a vehicle with a rear hatch, such as seat back assembly as shown generally in FIG. 1. One is fabricated using blow molded PULSE® 2200 BG resin (from The Dow Chemical Company). The other one is fabricated using blow molded MAGNUM® 1150 EM resin (from The Dow Chemical Company). The final assembly has an average wall thickness in the seat back of about 3 mm, and an average section thickness of about 30 mm. Both assemblies pass United States and European government test standards for motor vehicles as addressed in FMVSS 207 (49 CFR 571.207), FMVSS 225 (49 CFR 571.225) and ECE 17, as well as the requirements of automobile original equipment manufacturers and their suppliers.

EXAMPLE 3

Figure 16:
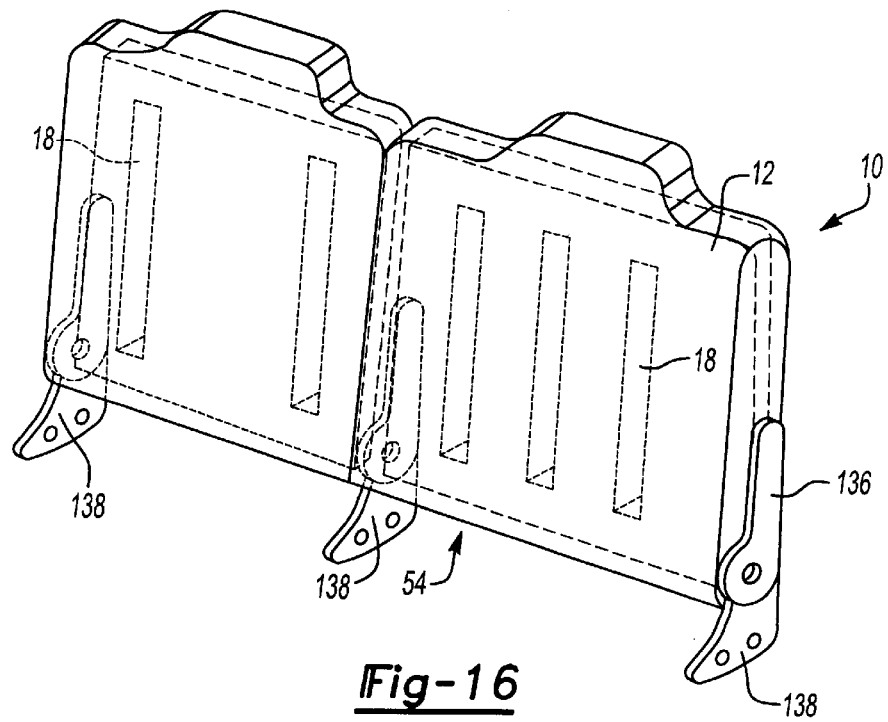
FIG. 16 is a perspective view of another exemplary seatback assembly.

Two seat back assemblies are fabricated for a vehicle to be a free-standing seat assembly, such as assembly as shown generally in FIG. 16 having individual integrated reinforcement structures 18 defining an integrated reinforcement structure pattern 54. The seat backs are secured to the vehicle body in white with a conventional lower lock/latch 136 connected to a bracket 138. One is fabricated using blow molded PULSE® 2200 BG resin (from The Dow Chemical Company). The other one is fabricated using blow molded MAGNUM® 1150 EM resin (from The Dow Chemical Company). The final assembly has an average wall thickness in the seat back of about 3 mm, and an average section thickness of about 30 mm. Both assemblies pass United States and European government test standards for motor vehicles as addressed in FMVSS 207 (49 CFR 571.207), FMVSS 225 (49 CFR 571.225) and ECE 17, as well as the requirements of automobile original equipment manufacturers and their suppliers.

EXAMPLE 4

Figure 17:
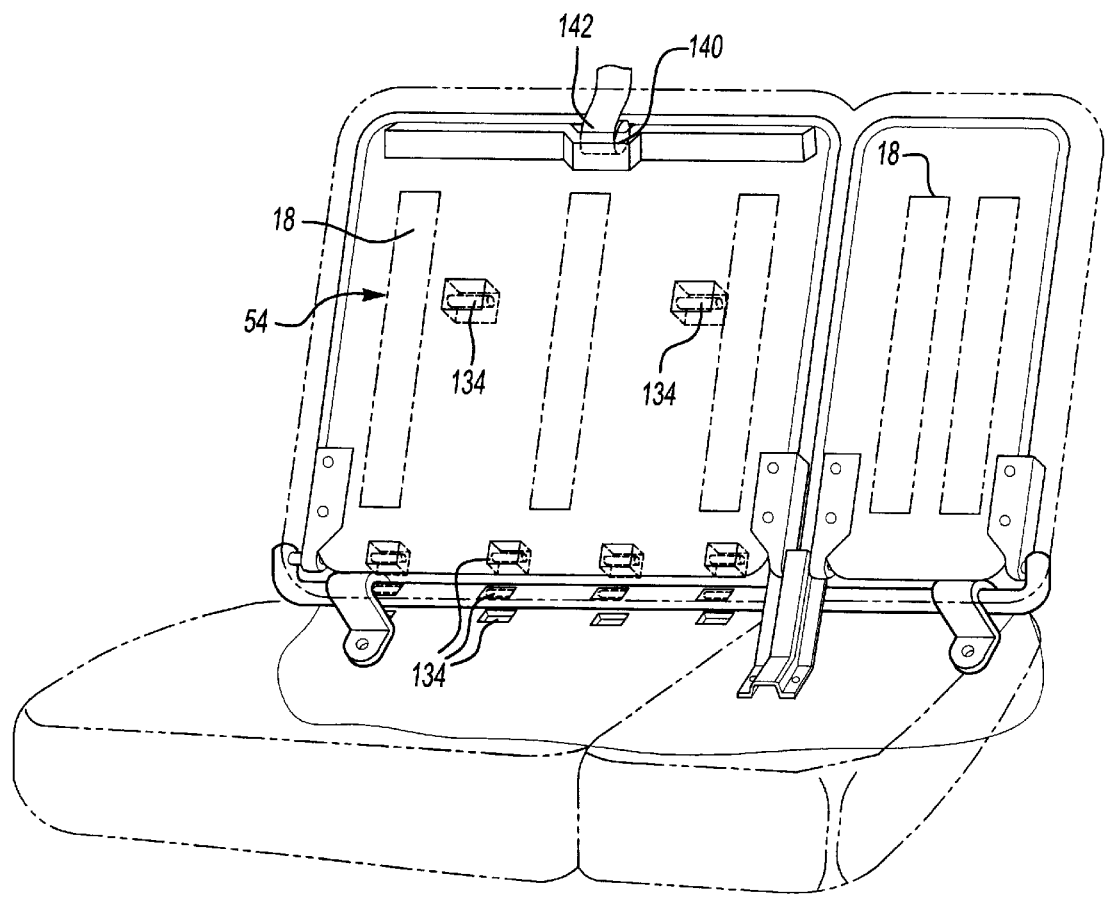
FIG. 17 is a perspective view of a seatback assembly illustrating associated components.

Two seat back assemblies are fabricated for a vehicle to have a center shoulder belt such as seat back assembly as shown generally in FIG. 17 having individual integrated reinforcement structures 18 defining an integrated reinforcement structure pattern 54 and a latch (not shown). One is fabricated, using blow molded PULSE® 2200 BG resin (from The Dow Chemical Company). The other one is fabricated using blow molded MAGNUM® 1150 EM resin (from The Dow Chemical Company). The seat back includes a housing 140 on one of its walls (illustrated optionally on the rear wall), for a seat belt retractor 142. The final assembly has an average wall thickness in the seat back of about 3 mm, and an average section thickness of about 30 mm. Both assemblies pass United States and European government test standards for motor vehicles as addressed in FMVSS 207 (49 CFR 571.207), FMVSS 210 (49 CFR 571.210), FMVSS 225 (49 CFR 571.225) and ECE 17, as well as the requirements of automobile original equipment manufacturers and their suppliers.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A seating assembly for an automotive vehicle, comprising:
   a seat back formed from a molded plastic having a forward wall portion and a rearward wall portion, and a plurality of individual integrated reinforcement structures for defining an integrated reinforcement structure pattern; and
   an attachment assembly adapted to anchor said seat back directly to at least one body in white portion of said automotive vehicle;
   wherein said seating assembly is capable of (1) withstanding without rupture at least about 13000 Newtons in the direction in which the seat faces in a plane, parallel to the longitudinal centerline of the vehicle; and (2) upon rapid acceleration up to about 20 to about 30 g, exhibiting substantially no fragmentation of the seat back with at least a 36 kg mass placed behind the seat back.

2. The seating assembly of claim 1, wherein a plurality of said individual integrated reinforcement structures includes a tack-off having a plurality of walls.

3. The seating assembly of claim 1, wherein a plurality of said individual integrated reinforcement structures includes at least one wall rib.

4. The seating assembly of claim 1, wherein said individual integrated reinforcement structures includes at least one enlarged rib.

5. The seating assembly of claim 1, wherein at least one of said individual integrated reinforcement structures includes a first portion having an enlarged wall thickness relative to a second adjoining portion.

6. The seating assembly of claim 1, wherein a plurality of said integrated reinforcement structures are generally vertically oriented.

7. The seating assembly of claim 1, wherein said individual integrated reinforcement structure is selected from letters, characters, shapes, symbols or a combination thereof.

8. The seating assembly of claim 1, further comprising a supplemental reinforcing insert configured for placement between said forward wall portion and said rearward wall portion of said blow molded plastic seat back.

9. The seating assembly of claim 1, wherein said seat back assembly includes a vehicle rear center seat back assembly and is further adapted for carrying a shoulder belt restraint.

10. The seating assembly of claim 1, wherein said seat back assembly is adapted for a vehicle free standing seat.

11. The seating assembly of claim 1, wherein said seat back assembly is adapted for a rear seat of an automotive vehicle having a hatchback.

12. The seating assembly of claim 1, wherein said seat back assembly is further adapted for carrying a child seat tether.

13. The seating assembly of claim 1, wherein said seat back is mounted directly to said vehicle body in white portion with a hinge assembly.

14. A seating assembly for an automotive vehicle, comprising:
    a seat back, formed from a molded plastic selected from styrenics, polyamides, polyolefins, polycarbonates, polyesters, or mixtures thereof, having a forward wall portion and a rearward wall portion, a plurality of individual integrated reinforcement structures for defining an integrated reinforcement structure pattern;
    a hinge assembly having a bracket portion including a first side wall portion, an opposing second side wall portion and an intermediate wall, said walls adjoined to one another defining a channel for receiving said seat back and a pivot member adapted to hingedly anchor said seat back directly to a first body in white portion of said automotive vehicle; and
    a latch secured to a second body in white portion of an automotive vehicle;
    a striker having a projecting striker bar attached to a mounting portion in overlapping engagement with said rearward wall portion of said seat back for interferingly engaging said latch to maintain said seat back in a generally upright position, wherein upon rapid acceleration to about 20 kg, in the presence of a cargo mass of about 36 kg disposed about 200 mm behind said seat back, the impact of said cargo mass results in substantially no fragmentation of said seat back.

15. The seating assembly of claim 14, wherein said seat back assembly includes a vehicle rear center seat back assembly and carries a shoulder belt restraint.

16. The seating assembly of claim 14, wherein said seat back carries a child seat tether.

17. A seating assembly for an automotive vehicle, comprising:
    an automotive vehicle rear seat back, formed from a blow molded plastic that includes acrylonitrile butadiene styrene, having a forward wall portion and a rearward wall portion, a plurality of individual integrated reinforcement structures for defining an integrated reinforcement structure pattern;
    a hinge assembly having a bracket portion defining a channel for receiving said seat back and a pivot member adapted to hingedly anchor said seat back directly to a first body in white portion of said automotive vehicle; and
    a latch secured to a second body in white portion of an automotive vehicle;
    a striker having a projecting striker bar attached to a mounting portion in overlapping engagement with said rearward wall portion of said seat back for interferingly engaging said latch to maintain said seat back in a generally upright position, wherein upon rapid acceleration to about 20 kg, in the presence of a cargo mass of about 36 kg disposed about 200 mm behind said seat back, the impact of said cargo mass results in substantially no fragmentation of said seat back.

18. The seating assembly of claim 17, wherein said seat back assembly includes a vehicle rear center seat back assembly and carries a shoulder belt restraint.

19. The seating assembly of claim 17, wherein said seat back assembly is further adapted for carrying a child seat tether.

20. The seating assembly of claim 19, wherein the blow molded plastic further includes a polycarbonate.

21. The seating assembly of claim 1, wherein said plurality of individual integrated reinforcement structures include at least one externally formed reinforcement structure.

22. The seating assembly of claim 21, wherein said at least one externally formed integrated reinforcement structure is selected from an indentation, a projection, or a combination thereof.

23. The seating assembly of claim 1, wherein said plurality of individual integrated reinforcement structures include at least one internally formed integrated reinforcement structure.

24. The seating assembly of claim 1, further comprising at least one externally located feature on said seat back.

25. The seating assembly of claim 24, wherein said at least one externally located feature is a retention mechanism, a child seat tether, a seatbelt, a shoulder restraint or a combination thereof.

26. The seating assembly of claim 1, further comprising a reinforced outer edge.

27. The seating assembly of claim 26, wherein said reinforced outer edge is an enlarged rib, an externally formed reinforcement structure, an indentation, a projection, a rounded portion, a change in material thickness, folded material, a bracket, an insert, or a combination thereof.

28. A seating assembly for an automotive vehicle, comprising:
    a seat back formed from a molded plastic having a forward wall portion and a rearward wall portion, and a plurality of individual integrated reinforcement structures for defining an integrated reinforcement structure pattern; and an attachment assembly adapted to anchor said seat back directly to at least one body in white portion of said automotive vehicle with a hinge assembly;

wherein said seating assembly is capable of (1) withstanding without rupture at least about 13000 Newtons in the direction in which the seat faces in a plane, parallel to the longitudinal centerline of the vehicle; and (2) upon rapid acceleration up to about 20 to about 30 g, exhibiting substantially no fragmentation of the seat back with at least a 36 kg mass placed behind the seat back.

29. A seating assembly for an automotive vehicle, comprising:

an automotive vehicle rear seat back, formed from a molded thermoplastic, having a forward wall portion and a rearward wall portion, a plurality of individual integrated reinforcement structures for defining an integrated reinforcement structure pattern;

means for hingedly anchoring said seat back to a first body in white portion of said automotive vehicle; and a latch and striker assembly for securingly attaching said seat back to a second body in white portion of said automotive vehicle to maintain said seat back in a generally upright position, wherein upon rapid acceleration to about 20 kg, in the presence of a cargo mass of about 36 kg disposed about 200 mm behind said seat back, the impact of said cargo mass results in substantially no fragmentation of said seat back.

30. A seating assembly for an automotive vehicle, comprising:

an automotive vehicle rear seat back, formed from a molded thermoplastic including acrylonitrile butadiene styrene, having a forward wall portion and a rearward wall portion, a plurality of individual integrated reinforcement structures for defining an integrated reinforcement structure pattern;

means for hingedly anchoring said seat back to a first body in white portion of said automotive vehicle; and a latch and striker assembly for securingly attaching said seat back to a second body in white portion of said automotive vehicle to maintain said seat back in a generally upright position, wherein upon rapid acceleration to about 20 kg, in the presence of a cargo mass of about 36 kg disposed about 200 mm behind said seat back, the impact of said cargo mass results in substantially no fragmentation of said seat back.

* * * * *